Figure 1:
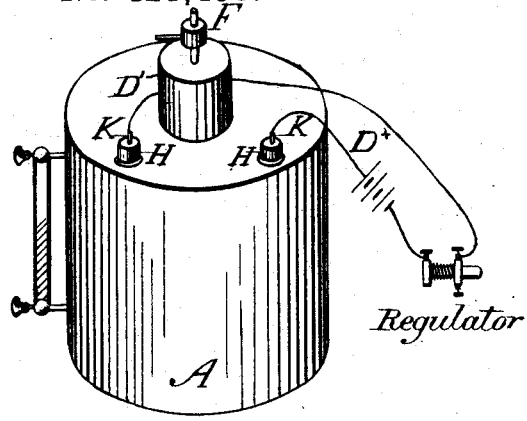

(No Model.)

J. C. HUBINGER.
APPARATUS FOR HEATING WATER AND GENERATING STEAM BY ELECTRICITY.

No. 421,498. Patented Feb. 18, 1890.

Witnesses
Anna Lalor
Charles M. Akerman

John C. Hubinger
Inventor
By his Attorney Benton J. Hall

UNITED STATES PATENT OFFICE.

JOHN C. HUBINGER, OF KEOKUK, IOWA.

APPARATUS FOR HEATING WATER AND GENERATING STEAM BY ELECTRICITY.

SPECIFICATION forming part of Letters Patent No. 421,498, dated February 18, 1890.

Application filed July 13, 1889. Serial No. 317,494. (No model.)

*To all whom it may concern:*

Be it known that I, JOHN C. HUBINGER, a citizen of the United States, residing at Keokuk, in the county of Lee, in the State of Iowa, have invented certain new and useful Improvements in the Apparatus of Heating Water and Generating Steam Therefrom; and I do hereby declare that the following is a clear, full, and exact description of the invention, which will enable others skilled in the art to which it appertains to make, exercise, and use the same.

Heretofore water has been heated for economic use and for the generation of steam as a dynamic force by the application of heat derived from the combustion of combustible material—such as wood, coal, and the like.

It is known that in electrotyping and other branches of similar art the attending electrolysis produces dissociation of the material employed in solution or otherwise and of the liquid employed, and that the electric current transmitted will to some extent heat the liquid through which it passes. It is also known that the transmission of an electric current through a given body or column of water under proper conditions will heat the water; but I am not aware that a given mass of water was ever before heated, or that any one has ever before attempted to heat it, by transmitting a current of electricity through small sections or portions of the mass uncontained and unconfined and unsupported, except by the mass of water surrounding, thereby heating such small portions or sections of the mass, causing them to be agitated by the heat and ebullition, creating currents in the mass, so that as rapidly as heated the portion or section moves away from the path and influence of the electrical current and brings other portions of the circumambient liquid under the like conditions, whereby the entire mass of water is ultimately heated.

The object of my invention is to heat water held or contained in vessels and to generate the steam therefrom by the introduction and transmission of one or more currents of electricity into and through greater or less portions, columns, or sections of the water to be heated, causing currents in the water in consequence of the colder portions rising to fill the place of the warmer, so that the entire mass of water is brought within the influence of electrical current and is rapidly and uniformly heated and steam generated therefrom.

To operate and carry out my invention I employ as the source of electric energy any known dynamo, galvanic battery, or generator of electric energy and connect the same by means of insulated wires arranged and constructed in the usual manner with the apparatus containing the water to be heated and from which the steam is to be generated. In describing the apparatus employed and shown in the drawings hereto attached, I do not in any manner limit my invention or the description thereof to the specific form and shape of the vessels and apparatus shown or the relations shown as to the size, quantity of water, or dimensions or magnitude of apparatus and their several parts, the resistance of the water or of the conducting-wires constituting the circuit, or the volume or energy of the electric current or of the dynamo, or other source of electric energy.

Figure 2:
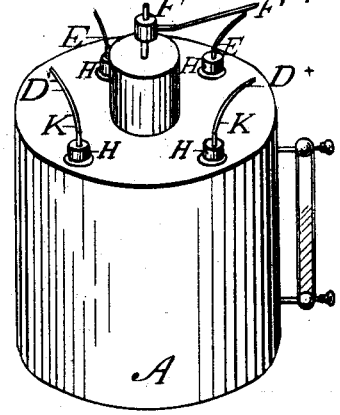
Figure 3:
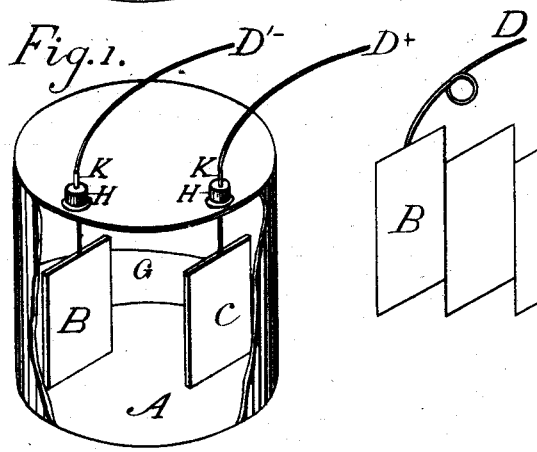
Figure 5:
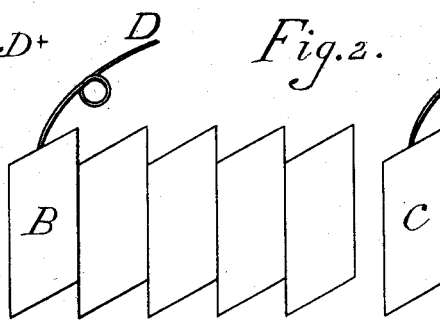
Figure 4:
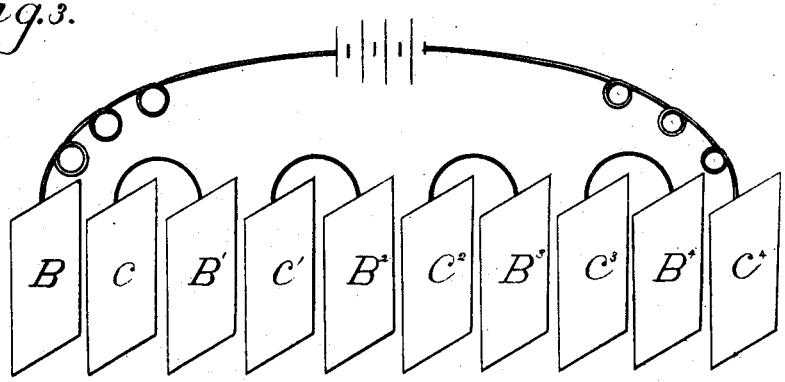

Figure 1 is a side elevation of a tank or boiler containing one pair of plates arranged according to my invention. Fig. 2 is a similar view of a tank or boiler containing two pairs of plates arranged according to my invention. Fig. 3 is a vertical section of the construction contained in Fig. 1. Figs. 4 and 5 are modified forms of my invention.

As illustrating my invention, I select a dynamo or other generator of electric energy capable of generating and transmitting upon a circuit composed of copper wire insulated and of the ordinary No. 12 size, as generally used for incandescent lighting, an electric force of five (5) amperes or upward.

The electric generator is connected with the water to be heated as follows: The vessel containing the water may be open or closed, depending upon the uses and purposes for which the water is to be heated. In case the vessel is open and the water is to be heated for purposes independent of the generation of the steam, the circuit of wires from the generator is brought to the vessel containing the water and the circuit is broken, and to the terminals of the wires, respectively, are connected electrically plates of metal or other material possessing conductivity. I prefer to use for this purpose copper plates about one-sixteenth ($\frac{1}{16}$) of an inch in thickness, their length and width depending upon the quantity of water to be heated and the form and shape of the vessel containing it. The terminals of the wires of the circuit are attached to the upper edges of the plates, so that the plates may be suspended in the water to be heated, leaving the upper edges about an inch above the surface of the water, while the lower edges extend to within about an inch of the bottom of the water. The plates thus suspended are preferably to face each other, their planes parallel and fixed so as not to change or shift their position by the agitation of the water. They are to be thus placed about one and three-fourths of an inch distant from each other, but the distance may be varied, dependent upon the depth or quantity of the water, the volume or energy of the electric current employed, and the other conditions. The plates and the wires are to be kept insulated from the vessel or apparatus containing the water.

It is not absolutely essential that the water to be heated or the vessel or apparatus containing it shall be insulated, but I prefer that the water shall be insulated, so as to constitute a complete and insulated connection of the circuit between the plates and terminals of the wires. This may be effected by the insulation of the apparatus or vessel itself by the usual and ordinary means; or the apparatus or vessel containing the water, with its connections, may be lined with insulating material; or the water may be otherwise contained and held in the interior of the apparatus or vessel by other vessels possessing no conductivity.

When the apparatus or vessel or the water itself is insulated, the greatest and most satisfactory results are attained, and there is little or no waste of electric energy.

In the case of a single pair of plates they may be attached to the terminals of that portion of the wires proceeding from the positive pole of the electric generator, or that portion near to or proceeding from the negative pole, or two or more pairs of plates may be connected, one to the terminals of the line of wire leading from the positive pole and two or more pairs to the negative. Indeed, an indefinite number of pairs of plates may be introduced into the circuit and suspended in like manner in the water to be heated, and several independent or divided circuits, with their respective pairs of plates, may be employed to heat the same body or mass of water; or the circuit constructed upon plan of the electric-arc system may be employed, and the pairs of plates introduced and connected in the same manner as the electric light and lamps. Any well-known regulator or controller—such as is common in the electric-arc system—may be introduced in the circuit and employed for similar purposes; but when two or more pairs of plates are employed they should be located and suspended in the water at points sufficiently remote from each other to prevent either being within the immediate electric influence of each other, or of the influence and operation of the electric current upon the column or section of water at and between the plates of the respective pair. The distance of location will depend upon the quantity and depth of the water, the size of the plates, and the electric energy employed. In case of plates placed within one and three-fourths inch of each other, three inches in width and twelve or fourteen inches in length, with an electric energy of five (5) ampères, the pair of plates should not be nearer to each other than from four to six inches, but may be placed at any distance or distances. The introduction of the pair of plates connected to the terminals of the circuit into the water, as explained, closes the circuit, except, of course, that the water being an inferior conductor, sufficient energy must be employed to overcome the resistance offered by it. It is not known that by this arrangement and the employment of sufficient energy to overcome the resistance of the water the entire mass of water is brought under the electric influence of the circuit, though by increasing the number of pairs of plates this may be practically done; but it will be seen that between the plates of each pair and in the immediate vicinity of each plate there is a section or column of water in and through which the electric current must pass, and which in effect constitutes part of and completes the electric current, and which will be affected and operated upon by the electric current. The effect of the electric influence is probably not limited to the section or portion of water located immediately and directly between the plates, but may affect and energize the water to a greater or less extent in all directions from and around each of the plates of a given pair, though its greatest effect will be upon the intermediate section or column of water in the direct lines of the current between the two plates.

In the case of a cylindrical vessel twelve inches in diameter and eighteen inches in length, arranged with two pairs of plates, one to the positive pole of the generator and the other to the negative, as shown in Fig. 2 of the accompanying drawings, with a number twelve (12) copper wire and employing about five (5) ampères of electric energy, the water immediately around the faces of each of the plates, and especially the column or section of water immediately between the respective plates of each pair within the direct course or path of the electric current between the two plates, will be rapidly heated and agitated, the upper portion of the water at and near the surface at and between the plates being more rapidly heated and agitated than the lower or deeper portions thereof. At once and in consequence of the agitation and levity of the heated water at and between the said plates quite rapid currents are created in the mass of water, by which all parts of the water are rapidly brought up to the plates and to the space between them and under the direct influence and effect of the electric current, and the entire mass of water is in a few moments brought to and kept at the boiling-point. In heating water for ordinary purposes a much smaller quantity of the electric energy may be employed, although it will require a greater length of time to bring the water up to a given degree of temperature; but the electric current being constant the temperature of the water can be continued indefinitely.

When it is desired to heat water for the purpose of generating steam as a motive power, the only change required in the condition is that the vessel containing the water to be heated shall be inclosed in a closed vessel of sufficient strength and capacity to resist the expansive force of the steam.

To explain more fully and particularly the nature of my invention and its mode of operation, reference will now be made to the accompanying drawings, on which similar letters refer to similar parts throughout the several views.

Figure 1 represents an iron steam-boiler capable of withstanding a high pressure of steam. A represents the boiler; F, the steam-pipe leading from the boiler to the cylinder of the steam-engine to be operated. D and D' represent the portion of a wire circuit proceeding from the generator to D, passing into the boiler through the insulating knob or bolt H K, and its terminal attached to the copper plate C within the boiler suspended in the contained water, as shown in Fig. 3. The plate B is attached to the terminal of the wire D' in like manner, from which wire D' passes out of the boiler through the insulator K H, and is conducted thence to the opposite pole of the generator, the electric circuit being completed by the section or column of water at and between the plates B C.

Fig. 2 is in exact conformity of construction with Fig. 1, except that two pairs of plates are employed, one pair being affixed to the terminals of that portion of the circuit D D' connected to the positive pole, and the other pair being affixed to the terminals of the portion of the circuit E E', so that the electric circuit proceeding from the pole of the generator will pass through the plates and intermediate water in the positive portion of the circuit D D', thence out and back through E E' and the plates and intermediate water to the negative pole of the generator.

Fig. 3 is an exposed view of the interior of an open vessel containing water, G G representing the water-line at the surface.

Fig. 4 represents a series of pairs of plates connected in circuit, as they should be when suspended in the water to be heated. To complete the circuit, the electric energy would be required to overcome the resistance of the columns or sections of water between the plates B C B' C' $B^2 C^2 B^3 C^3 B^4 C^4$, the several plates B C constituting what is herein called "pairs," and the several pairs being connected in the circuit by the various wires shown. The wires constituting the circuit may pass into the vessel containing the water at its sides, or laterally or in other directions, as well as from above; but the wires preferably should be out of the water and attached to the upper edges of the plates, so that the wires and upper edges of the plates are out of water.

As already explained, when the electric current is turned on the circuit with sufficient energy the plates B C are energized and the resistance of the intermediate water overcome, the circuit is closed, and the heat is evolved in the water, and currents created in the water, whereby all portions of the mass of water are brought within the influence of the electric current and the entire mass rapidly heated. In a boiler of the construction of Fig. 2, about thirteen inches in diameter and seventeen inches in height, with a No. 12 copper wire and five ampères of electric energy, a steam-pressure of twenty pounds can be generated in from ten to twenty minutes, by means of which a one or more horse-power engine can be rapidly and continuously operated.

In describing my invention I do not attempt any explanation of the phenomenon by which the heat is evolved or generated, or whether the electric energy in passing from one plate to the other as it overcomes the resistance of the water is resolved into heat during its passage and is then re-resolved into the electric force, or whether it simply develops the latent heat of the water; nor are my claims limited by such consideration.

My invention consists in bringing sections or columns of the water within the influence of the electric current between and around the plates, creating currents in the mass of the water, so that the whole mass comes subject to the required conditions, whereby the entire mass is rapidly heated and steam generated.

It is evident that my process of heating water can be applied to the several and various purposes of domestic economy, to the heating of houses and cars, and other uses where either steam or hot water is employed. For this purpose the same wires and electrical currents used for lighting may be used and employed wherever steam is now employed as a motive power when generated by fuel and combustion or other means.

I make no claim for the method or process shown and described in this application; but have shown and described and claimed the same in another application filed contemporaneously with this application, Serial No. 317,495, filed July 13, 1889.

Having described my invention, what I claim, and desire to secure by Letters Patent, is—

1. In an apparatus for heating liquids and generating steam, the combination, with a vessel containing the liquid, of a pair of plates arranged with an interposed comparatively small section or column of said liquid, a generator of electricity, and conductors connecting the generator and plates, whereby the comparatively small section or column of liquid is first heated and a consequent circulation and heating of the entire mass or body of the liquid effected.

2. In an apparatus for heating liquids and generating steam, the combination, with a vessel containing the liquid to be heated, of two or more pairs of plates arranged with an interposed comparatively small section or column of water between the plates of each pair of plates, a generator of electricity, and a conductor or conductors connecting the generator and plates, whereby the comparatively small section of liquid between the plates of each respective pair of plates is first heated and a consequent circulation and heating of the entire mass or body of the liquid effected.

3. In an apparatus for heating liquids and generating steam, the combination, with a vessel containing the liquid to be heated, of a series of pairs of plates arranged with an interposed comparatively small section or column of the liquid between the plates of each respective pair of plates and arranged according to the multiple-arc system with reference to each other, and conductors connecting the generator and the plates, whereby the comparatively small sections or columns of water are first heated and a consequent circulation and heating of the entire mass or body of the liquid effected.

4. In an apparatus for heating liquids and generating steam, the combination, with a vessel containing the liquid to be heated, of a series of pairs of plates arranged with reference to each other according to the system of the multiple arc, and having interposed between the plates of each respective pair of plates a comparatively small section or column of said liquid, conductors connecting the generator and said plates, and a regulator or controller of electricity introduced in the circuit, whereby the energy of the current can be controlled, cut off, or turned on, the comparatively small sections or columns of the liquid are first heated, and a consequent circulation and heating of the entire mass or body of the liquid effected.

JOHN C. HUBINGER.

Witnesses:
JOHN P. HORNISH,
ISAAC BLOM.